(12) United States Patent
Tzoreff et al.

(10) Patent No.: US 12,739,923 B2
(45) **Date of Patent: *Sep. 15, 2026**

(54) ACCELERATED NETWORK RECONNECT USING PREVIOUS CONNECTION PARAMETERS

(71) Applicant: Texas Instruments Incorporated, Dallas, TX (US)

(72) Inventors: Yaniv Tzoreff, Jerusalem (IL); Gilboa Shveki, Shoham (IL); Avi Baum, Giva'at Shmuel (IL); Barak Cherches, Ramat Hakovesh (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 29 days.

This patent is subject to a terminal disclaimer.

(21) Appl. No.: 18/780,733

(22) Filed: Jul. 23, 2024

(65) Prior Publication Data

US 2024/0380658 A1 Nov. 14, 2024

Related U.S. Application Data

(63) Continuation of application No. 18/146,161, filed on Dec. 23, 2022, now Pat. No. 12,068,919, which is a (Continued)

(51) Int. Cl.
*G06F 15/16* (2006.01)
*H04L 41/0803* (2022.01)
(Continued)

(52) U.S. Cl.
CPC ......... *H04W 76/19* (2018.02); *H04L 41/0803* (2013.01); *H04L 41/0856* (2013.01);
(Continued)

(58) Field of Classification Search
CPC . H04W 76/19; H04L 41/0803; H04L 41/0856
See application file for complete search history.

(56) References Cited

U.S. PATENT DOCUMENTS 7,884,572 B2 2/2011 Zhao
8,750,178 B2 6/2014 Wietfeldt
(Continued)

FOREIGN PATENT DOCUMENTS

CN 101765222 A 6/2010
CN 105393630 B 7/2019
CN 106452924 B 11/2019

OTHER PUBLICATIONS

CN first Office Action; Translation; PRC (China) Pat. Appln. No. 201810614930.4, received Jun. 4, 2021, 24 pgs.
(Continued)

*Primary Examiner* — Duyen M Doan
(74) *Attorney, Agent, or Firm* — Michelle F. Murray; Frank D. Cimino

(57) ABSTRACT

A Wi-Fi device includes a controller coupled to a writeable memory implementing a MAC and PHY layer and to a transceiver. Connection data stored in the writeable memory includes Wi-Fi connection parameters including ≥1 router MAC level information or a most recently utilized (MRU) channel used, and IP addresses including ≥1 of an IP address of the Wi-Fi device, IP address of the MRU router, an IP address of a MRU target server, and an IP address of a network connected device. An accelerated reconnecting to a Wi-Fi network algorithm is implemented by the processor is for starting from being in a network disconnected state, establishing current connection parameters for a current Wi-Fi network connection using the Wi-Fi connection parameters for at least one MAC layer parameter for the MAC layer.

20 Claims, 6 Drawing Sheets

Related U.S. Application Data continuation of application No. 17/166,031, filed on Feb. 3, 2021, now Pat. No. 11,539,589, which is a continuation of application No. 15/630,560, filed on Jun. 22, 2017, now Pat. No. 10,944,632.

(51) Int. Cl.

| | |
|---|---|
| ***H04L 41/0853*** | (2022.01) |
| ***H04W 76/19*** | (2018.01) |
| *H04L 41/50* | (2022.01) |
| *H04W 48/18* | (2009.01) |
| *H04W 84/12* | (2009.01) |

(52) U.S. Cl.

CPC ............ *H04L 41/50* (2013.01); *H04W 48/18* (2013.01); *H04W 84/12* (2013.01)

(56) References Cited

U.S. PATENT DOCUMENTS

| | | | | |
|---|---|---|---|---|
| 9,532,312 | B1 | 12/2016 | Kim | |
| 9,894,604 | B1 * | 2/2018 | Tran | H04W 12/08 |
| 10,547,555 | B2 | 1/2020 | Lee | |
| 2002/0007407 | A1 | 1/2002 | Klein | |
| 2002/0194367 | A1 | 12/2002 | Nakamura | |
| 2004/0266430 | A1 | 12/2004 | Fudim | |
| 2006/0068751 | A1 | 3/2006 | Chandra | |
| 2008/0049702 | A1 | 2/2008 | Meylan | |
| 2008/0075035 | A1 | 3/2008 | Eichenberger | |
| 2008/0144576 | A1 | 6/2008 | Pan | |
| 2009/0103515 | A1 * | 4/2009 | Pointer | H04L 69/16 370/350 |
| 2011/0002261 | A1 | 1/2011 | Mocanu | |
| 2012/0057578 | A1 | 3/2012 | Park | |
| 2012/0327849 | A1 * | 12/2012 | Lin | H04W 48/20 370/328 |
| 2013/0052951 | A1 | 2/2013 | Hwang | |
| 2013/0343344 | A1 | 12/2013 | Hassan | |
| 2014/0092755 | A1 * | 4/2014 | van de Ven | H04W 48/20 370/252 |
| 2014/0185469 | A1 | 7/2014 | Marmolejo-Meillon | |
| 2014/0185605 | A1 | 7/2014 | Oh | |
| 2014/0293829 | A1 * | 10/2014 | Visuri | H04W 64/003 370/254 |
| 2015/0271834 | A1 | 9/2015 | Ma | |
| 2015/0312833 | A1 | 10/2015 | Gresset | |
| 2016/0062717 | A1 * | 3/2016 | Kawasaki | G06F 3/1292 358/1.15 |
| 2016/0127152 | A1 * | 5/2016 | Balwani | H04L 12/5692 709/224 |
| 2016/0380989 | A1 | 12/2016 | Bailey | |
| 2016/0381722 | A1 * | 12/2016 | Konji | H04W 76/18 370/329 |
| 2017/0070976 | A1 | 3/2017 | Shirakawa | |
| 2017/0273122 | A1 | 9/2017 | Hu | |
| 2017/0308338 | A1 * | 10/2017 | Maeda | G06F 3/1292 |
| 2018/0077642 | A1 | 3/2018 | Mandiganal | |
| 2018/0097980 | A1 | 4/2018 | Nishimura | |
| 2018/0338336 | A1 | 11/2018 | Seo | |

OTHER PUBLICATIONS

Suarez, et al. "Automatic Resumption of RTSP Sessions in Mobile Phones using JADE-LEAP", IEEE Latin America Transactions, vol. 7, No. 3, Jul. 2009, 8 pgs.

Tozlu, et al., "Wi-Fi Enabled Sensors for Internet of Things: A Practical Approach", IEEE Communications Magazine, vol. 50, Issue 6, Jun. 6, 2012, pp. 134-143.

* cited by examiner

ACCELERATED NETWORK RECONNECT USING PREVIOUS CONNECTION PARAMETERS

CROSS-REFERENCE TO RELATED APPLICATIONS

This application is a continuation of U.S. patent application Ser. No. 18/146,161, filed Dec. 23, 2022, which is a continuation of U.S. patent application Ser. No. 17,166,031, filed Feb. 3, 2021, now U.S. Pat. No. 11,539,589, which is a continuation of U.S. patent application Ser. No. 15/630,560, filed Jun. 22, 2017, now U.S. Pat. No. 10,944,632, which applications are hereby incorporated herein by reference.

FIELD

Disclosed embodiments relate generally to the field of network communications, more specifically to Wi-Fi enabled devices and Wi-Fi communications.

BACKGROUND

Wi-Fi as known in the art is a wireless technology that uses radio waves to connect devices to the Internet wirelessly, that is generally based on the Institute of Electrical and Electronics Engineers (IEEE) 802.11 specification, currently the IEEE 802.11b/g/n which operates wirelessly at in a band at 2.4 GHz or 5 GHZ, where the IEEE 802.11 family shares the same basic protocol. IEEE 802.11 provides a set of media access control (MAC, or Data Link) layer and physical layer (PHY) specifications for implementing wireless local area network (WLAN) communication. The PHY layer and MAC layer reside in the Open Systems Interconnection (OSI) stack or the OSI 7 layer model, where Layer-1 is known as the PHY layer and Layer-2 is known as the MAC layer. Wi-Fi is a key technology enabling wireless devices to connect directly to one another, to wide area networks, or simply to the Internet in order to provide remote monitoring and control of a system. As such, it is becoming a major driver in the rapid expansion of the Internet of Things (IOT).

Wi-Fi devices commonly operate in WLAN networks. Power conservation is generally an important consideration for Wi-Fi devices which are typically battery powered. One Wi-Fi use case which is commonly used by battery operated devices is a Wi-Fi enabled sensor network setup. The network includes multiple Wi-Fi enabled sensors/actuators that are associated with a wireless router functioning as an Access Point (AP) through which the nodes are connected to Internet. The Wi-Fi device enables Wi-Fi, connects to the network, transmits/receives data, and in a sleep-mode significantly reduces its power consumed by turning off the modem, or in some cases turning off essentially the entire Wi-Fi device for a short duration to a long duration entering a sleep period where the Wi-Fi device is also disconnected from their AP until the next communication cycle begins. Improving power efficiency for Wi-Fi devices in such a use case is possible in several regards, one method being better utilization of the Wi-Fi specification.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize as part of the IOT revolution there is a growing need for low power device connectivity. Having a low power Wi-Fi device solution can be an important customer requirement, and users generally need a longer operational lifetime with smaller (lower power) batteries. One typically use is battery operated devices to enable the Wi-Fi device to connect to the Internet, to transmit/receive data, and disconnect from the network then going to sleep or a reset state until the next cycle.

Most Wi-Fi enabled devices (Wi-Fi devices) connect to a Wi-Fi router (or AP) after conducting a multi-step connection procedure, typically controlled by a connection manager. Such Wi-Fi devices scan for all supported channels (e.g., in a 2.4 GHz band and/or in a 5 GHz band) in their vicinity with their radio/modem actively switching between the Wi-Fi channels in the band, comparing the scan results to stored Service Set Identifier (SSID) or required SSID, and then selecting the best available network. Channel selection can be based on a Received Signal Strength Indicator (RSSI) which is generally one of the most important selection parameters utilized, but channel selection can also depend on the particular implementation and thus can be based on other considerations including profile priority, security, and Internet connectivity. Selecting the network generally also includes selecting a particular router from a plurality of routers unless the area includes only one network, and selecting a channel used to communicate with the selected router, thus a single and constant channel.

The known Wi-Fi device also acquires its own IP address (needed to facilitate routing of packets and packet acknowledgements to the Wi-Fi device) using Dynamic Host Configuration Protocol (DHCP) received from a DHCP server that in addition distributes network configuration parameters as the target Internet server (Domain Name Server (DNS) server). Other IP addresses, as for routers, servers and/or target stations are resolved using Address Resolution Protocol (ARP).

This known Wi-Fi enabled device deletes (or 'cleans') the connection parameters used after each session is ended so that the connection parameters previously used are not stored in its memory, and thus upon wake-up from being disconnected from the network, the known Wi-Fi device must establish a connection in its different layers (mostly being datalink/MAC layer parameters, L2) anew each time. Each one of these connection steps can take a relatively long period (up to several seconds total to complete all these steps), which can have a significant impact on the overall power efficiency of the Wi-Fi device and the user's experience, particularly the high modem power known to be needed for channel scanning required to obtain a new Wi-Fi network connection and for transmitting and receiving relevant packets for reestablishing the L2/L3/L4 device parameters. In L2/L3 actions are taken in order to reconstruct parameters. In L4, if able to reconstruct L2/L3, one can passively keep using L4 parameters.

Disclosed embodiments store connection data to provide stored Wi-Fi connection parameters and IP addresses for at least a most recently utilized (MRU) Wi-Fi network connection used by the Wi-Fi device. The Wi-Fi connection parameters include at least one of router MAC level information obtained from a MRU router, a MRU channel used, and optionally IP addresses including at least one of an IP address of the Wi-Fi device, an IP address of the MRU router, an IP address of a MRU target server in Internet communications with the MRU router, and an IP address of at least one network connected device to the MRU Wi-Fi network.

An accelerated reconnecting to a Wi-Fi network algorithm comprises software stored in the writeable memory that is implemented by the processor. The algorithm is for starting from the Wi-Fi device being in a network disconnected state, establishing current connection parameters for a current Wi-Fi network connection using the Wi-Fi connection parameters for at least one MAC layer parameter for the MAC layer and optionally establishing networking parameters using the IP addresses for communicating in at least an IP layer of the Wi-Fi device. The Wi-Fi device then wirelessly communicates using the current Wi-Fi network connection.

Thus, once the Wi-Fi device is enabled again after sleep or after being essentially off where the memories were reset but the stored connection data is not deleted, or after being disconnected from the router, it is assumed that there is a good probability that there is a need to connect to the same MRU Wi-Fi network. For example, a sensor coupled to a Wi-Fi device may still be at one's home or in a factory. The stored connection data is accessed from the Wi-Fi device's memory, and the Wi-Fi connection parameters are used to try to reconnect, first without performing a new full scan. If this connection attempt is successful, the method can keep reconstructing the MRU network data as IP addresses, DNS server, and ARP. If this reconnect attempt fails, the method performs a regular scan or a 'smart' scan being a scan in which the order of channels scanned is based on the profile connections history, trying to connect to one of the stored Wi-Fi network connections.

As a significant percentage of Wi-Fi devices use cases involve stationary systems or devices connecting frequently to the same router/AP, such as for sensor applications. Disclosed embodiments can use a non-volatile-memory or other memory which does not get erased for the Wi-Fi device to store needed connection data which can be read from the memory and then used in various Wi-Fi device layers in the OSI 7 layers concept being L2 (the MAC layer), L3 (the network/IP layer), and LA (the transport layer) to accelerate the reconnect process. The probability to find the required network, terminate the scan if at all, and reconnect to the Wi-Fi network fast is much higher than other known solutions because the MAC layer, and optionally IP layer and applications layer are being at least partially restored. As a result of the accelerated the reconnect process, there is a reduction in the Wi-Fi device power consumption, as well as the time to send or receive data.

BRIEF DESCRIPTION OF THE DRAWINGS

Reference will now be made to the accompanying drawings, which are not necessarily drawn to scale, wherein.

DETAILED DESCRIPTION

Figure 1:
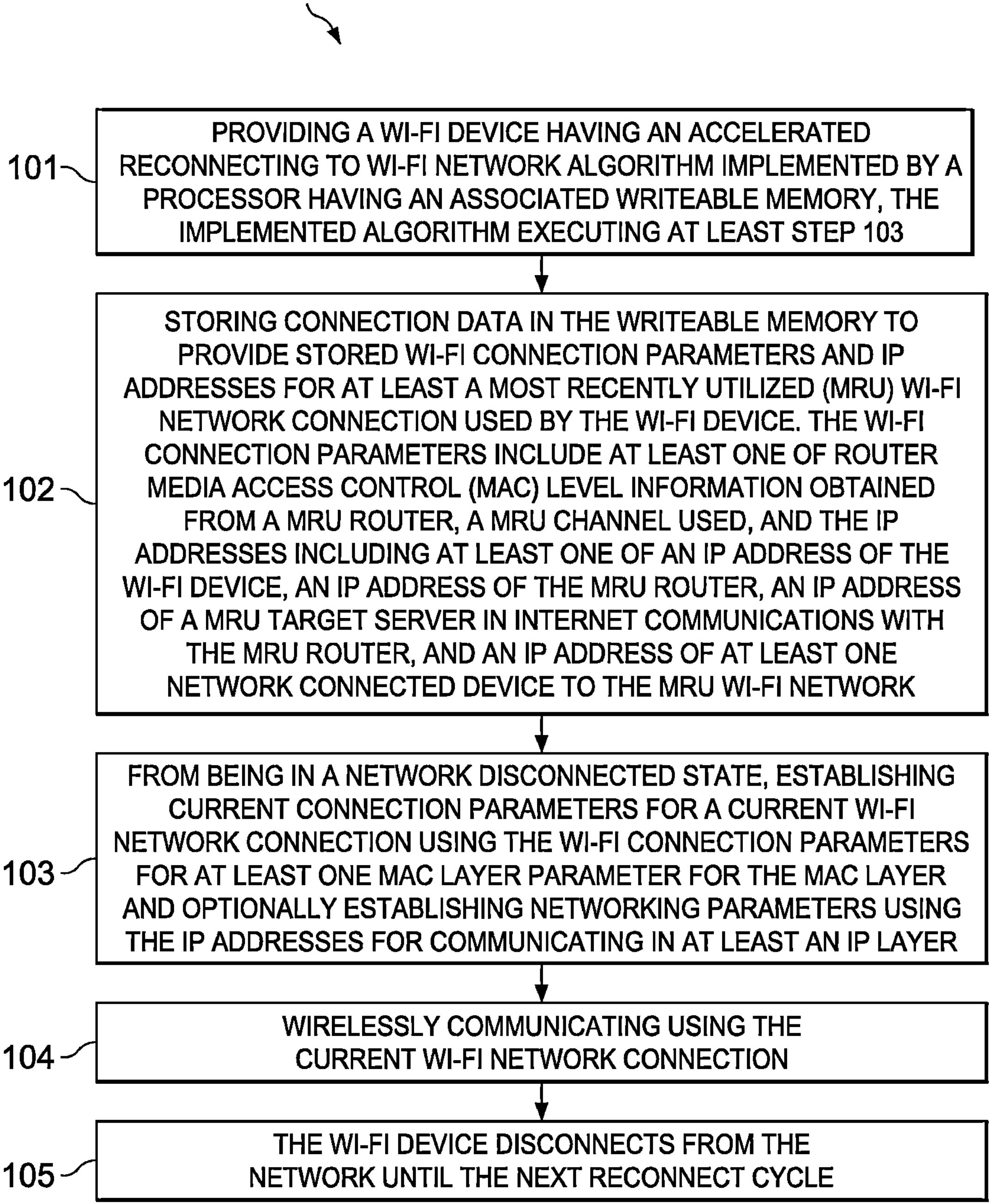
FIG. 1 is a flowchart for an example method of accelerated reconnecting of a Wi-Fi enabled device to a Wi-Fi network including establishing current connection parameters using at least one of the stored Wi-Fi connection parameters for a current Wi-Fi connection to the Wi-Fi network, according to an example embodiment.

Example embodiments are described with reference to the drawings, wherein like reference numerals are used to designate similar or equivalent elements. Illustrated ordering of acts or events should not be considered as limiting, as some acts or events may occur in different order and/or concurrently with other acts or events. Furthermore, some illustrated acts or events may not be required to implement a methodology in accordance with this disclosure.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a flowchart for an example method 100 of accelerated network reconnecting of a Wi-Fi device to a Wi-Fi network. Step 101 comprises providing a Wi-Fi device including an accelerated reconnecting to Wi-Fi network algorithm generally provided as software (firmware) implemented by a processor having an associated writeable memory on the Wi-Fi device executing at least step 103 described below. The writeable memory can comprise a random access memory (RAM), and may comprise a low leakage non-volatile memory. Step 102 comprises storing connection data in the writeable memory to provide stored Wi-Fi connection parameters and IP addresses for at least a most recently utilized (MRU) Wi-Fi network connection used by the Wi-Fi device.

The Wi-Fi connection parameters include at least one of router media access control (MAC) level information obtained from a MRU router, a MRU channel used. The Wi-Fi connection parameters stored include the IP addresses including at least one of an IP address of the Wi-Fi device, an IP address of the MRU router, an IP address of a MRU target server in Internet communications with the MRU router, and an IP address of at least one network connected device to the MRU Wi-Fi network. The MRU channel is generally a Wi-Fi channel in the 2.4 GHz band or in the 5 GHz band.

Step 103 comprises starting from being in a network disconnected state, establishing current connection parameters for a current Wi-Fi network connection using the Wi-Fi connection parameters for at least one MAC layer parameter for the MAC layer. The establishing current connection parameters can optionally comprise establishing networking parameters using the IP addresses for communicating in at least an IP layer of the Wi-Fi device. After disconnection from the network the Wi-Fi device will generally go to sleep (commonly the use case to save maximum power) or reset, but the Wi-Fi device can also stay awake after the disconnection. The Wi-Fi device can also go to sleep without disconnecting from the network, and then no disclosed fast network reconnect is needed. Three embodiments for step 103 are described below. Step 104 comprises the Wi-Fi enabled device wirelessly communicating using the current Wi-Fi connection. After wirelessly communicating, the Wi-Fi device generally transmits/receives data, such as sensor data in the case of a mesh network, and in step 105 the Wi-Fi device disconnects from the network until the next reconnect cycle.

A first embodiment comprises based on the MRU Wi-Fi network, trying to reconnect to this same Wi-Fi network on the MRU channel used obtained from the stored Wi-Fi connection parameters obtained from a probe response/beacon. The router for obtaining the probe response or beacon signal is shown as wireless router/AP 520 in FIGS. 5A and 5B described below. A significant advantage of this first embodiment is that it completely avoids the need for the Wi-Fi device to perform any channel scanning.

If it is determined the MRU channel cannot be used, such as due to an RSSI<a threshold RSSI, a second embodiment that involves some limited scanning comprises maintaining a networks database in the writeable memory of the Wi-Fi device with Wi-Fi connection parameters for a plurality of previous Wi-Fi network connections besides the MRU Wi-Fi network connection each including at least the last channel appearing on the respective Wi-Fi network connections. When a scan procedure starts in this second embodiment, the order of the channels to be scanned can be set in the example following three steps. The first step can comprise the former connected networks' channels being ordered according to the network's priority. For example, priority may be set by the user, or by Internet connection availability experienced in the past. The second step can comprise scanning selected channels in the Wi-Fi network such as channel 1, 6, and 11 (if not scanned as part of the first step). Channels 1, 6, and 11 can represent the social channels, meaning the most common channels used. The third step can comprise scanning the rest of the channels that may collectively number of total of 14 (for the 2.4 GHz band). An equivalent procedure can be used for the 5 GHz band, or other frequency band.

An early termination mechanism can be used to abort the scan procedure in the case a channel is found that provides results with a satisfactory score. The score can be a result of a weight function taking into consideration one or several parameters including at least the RSSI, and optionally the network priority and security of the network. After a channel is selected the parameter reconstruction may be aborted in case the connection attributes seems to be significantly changed. For example, comparing some of the data in the MAC layer or in the IP layer can be performed. In one example, if it is found that the network is not the same network, one may not try to restore the IP addresses. As another example if the DHCP server does not agree a notification can be given that provides a different IP address for the DHCP server, and the stored ARP table will not be used, instead a new ARP table will be built.

A third embodiment comprises regaining stored networking parameters including IP addresses, ARP responses, open sockets, and other networking connections without reestablishing the entire connection handshake, and trying to reactivate the networking channel without reopening it, or without performing the regular process. Without reopening the networking channel as used herein means reactivate the networking channel without conducting the full process of a regular opening procedure. For example, if opening a socket takes X steps, one can do it in 0 steps, if IP address(es) are obtained, one can do it in 2 ways of handshake and not in 4 ways of handshake. As in the first and second embodiments described above since the same L2 network (same Wi-Fi connection data including MAC address information as the same connected router/AP with the same MAC address is being used) is reestablished, the probability for this being an accelerated restoration to succeed is significant.

Figure 2A:
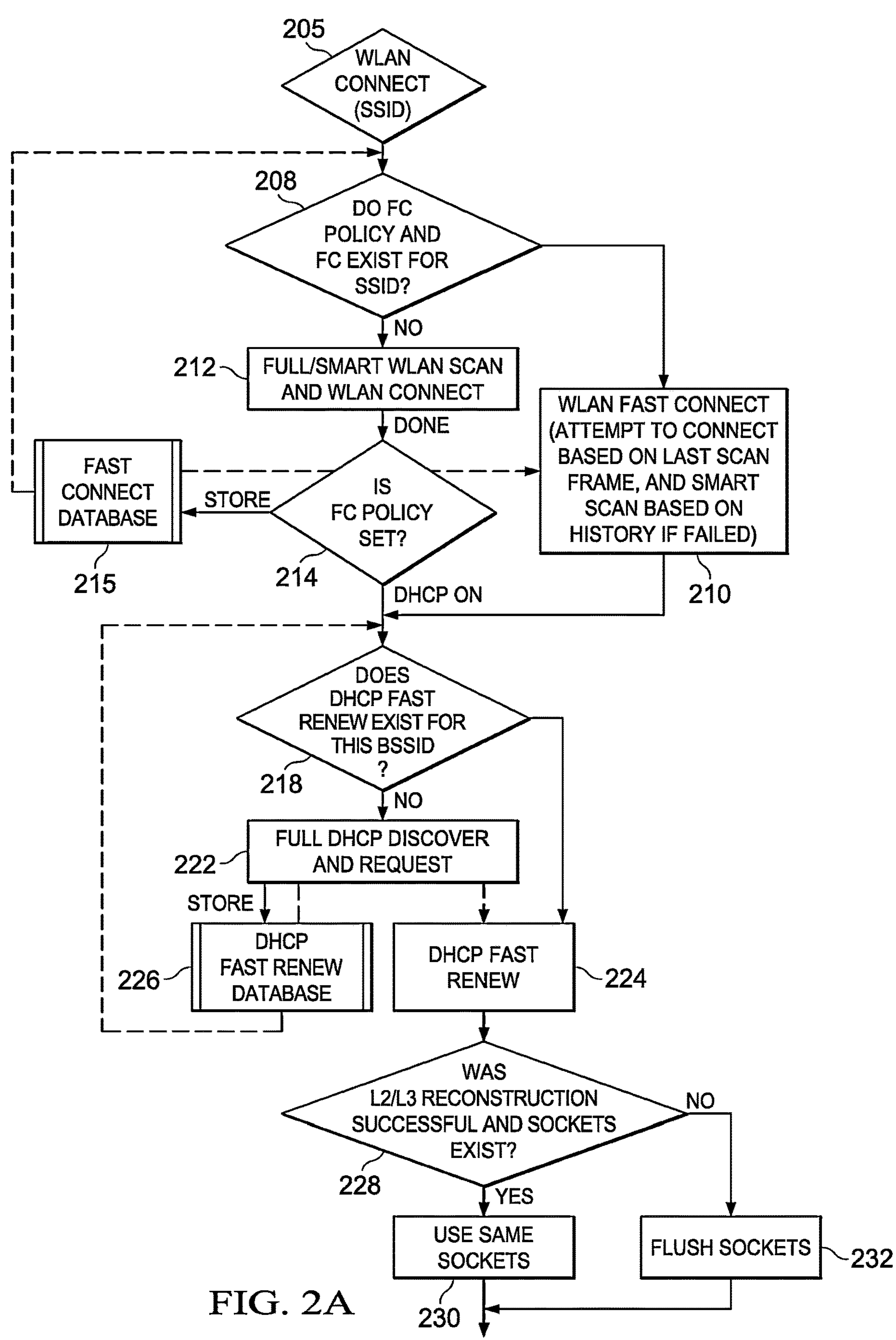
FIGS. 2A and 2B show an example high level description of disclosed establishing current connection parameters using at least one of the stored Wi-Fi connection parameters for a current Wi-Fi connection to the Wi-Fi network showing activities in the various device layers.
Figure 2B:
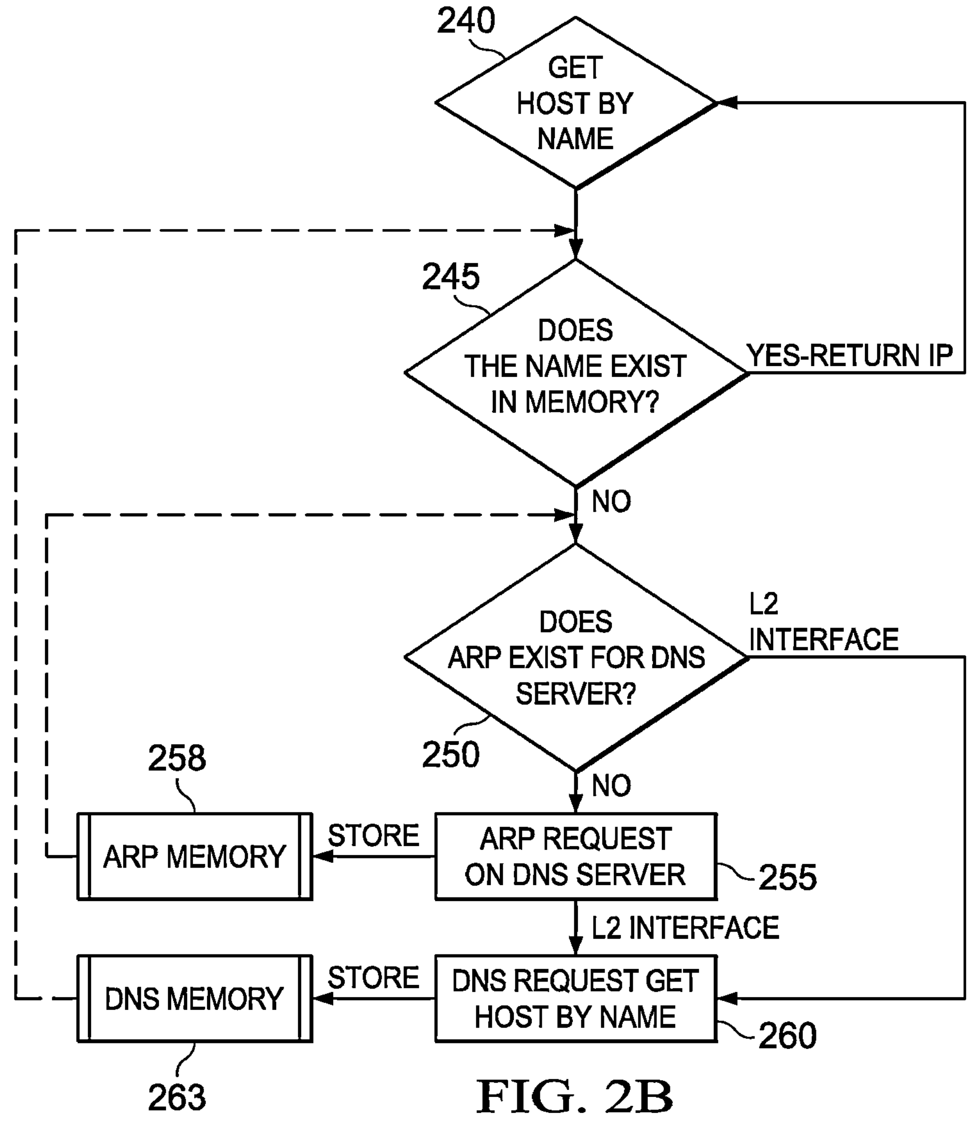

FIGS. 2A and 2B show an example high level description of steps in establishing current Wi-Fi network connection parameters using the Wi-Fi connection parameters for at least one MAC layer parameter for the MAC layer and optionally IP address(es) (corresponding to step 103 in FIG. 1) for accelerated reconnecting of a Wi-Fi enabled device to a Wi-Fi network showing activities in the various device layers of the Wi-Fi enabled device. The sequence in time is first the FIG. 2A shown activities (filling L2 and L3), and then the FIG. 2B shown activities (filling L2.5 (being a layer between Layer 2 and Layer 3), and L3). L4 is not shown in FIGS. 2A and 2B as no special L4 activity is generally needed. It is assumed the socket is open and the Wi-Fi enabled device is trying to communicate. If the Wi-Fi enabled device gets an error message, a new connection is opened. This is not shown as it is a regular flow of a conventional socket fail procedure.

On the left FC as in "FC policy" refers to a 'fast connect'. FIG. 2A shows activities following the application program interface (API) "WLAN connect" 205 and it includes both L2 filling activities and optional IP address acquiring.

Step 208 comprises determining whether the FC policy is enabled, and whether the parameters for the specific SSID provided in the WLAN connect 205 command, are indeed stored in the database. If a general "WLAN connect" command is applied without a specific SSID provided, the connection manager will try to connect the last connected Wi-Fi network without checking the database. Thus, if the FC policy is enabled, and if the data for this SSID is already stored, the FC process can be started. If the user asks for a different router than the ones in the database, a full connect process will be generally used.

If the FC policy is enabled, and the SSID exists in the database or no specific SSID was provided, the first connection attempt is reached shown as a 'WLAN fast connect' 210 which refers to the above-described non-scanning first embodiment which is based on the MRU Wi-Fi network connection, comprising trying to reconnect to this same MRU Wi-Fi network on the MRU channel used and at least one other stored connection attribute. A fast connect database (DB) 215 is shown accessed by the Wi-Fi device for its stored MRU Wi-Fi network connection information for implementing the WLAN FC 210. By the Wi-Fi device setting this policy, a "scan frame" will be stored in the memory (e.g., non-volatile memory) of the Wi-Fi device for a no-scan FC, and "last-connected" channel and SSID stored in "profile history" table, to be used in the next FC process, or to be prioritized as the first scan result in case the "scan frame" (FC) connection was not successful and a 'smart' scan will begin.

If the FC policy is disabled, or the data does not exist for the provided SSID, the block shown as full/smart WLAN scan+WLAN connect 212 is reached. A full scan is a regular (conventional) scan. The smart scan is a scan which the order of channels is based on the profile connections history. For example, if one has seen a profile working on channel 7, the smart scan will start with channel 7, and only if the result didn't satisfy the decision mechanism, the scan will move on to the rest of the WLAN channels. Upon completion of the full/smart WLAN scan and WLAN connect 212, block 214 checks whether the FC policy is set. If the FC policy is set, the connection data from the full/smart WLAN scan and WLAN connect 212 is stored in the fast connect DB 215, which as noted above can be a non-volatile memory.

A WLAN "profile history" table including connection parameter can be stored in the fast connect DB 215. For each successfully connected SSID profile (same as Wi-Fi network connection attributes) its connected channel and the "last connected" indication can be stored, so that the smart scan will be using this channel to prioritize the scan. Using first-result-match option (a scan early termination feature), the smart scan can abort the rest of the scan procedure, assuming a sufficiently satisfactory result is found. The FC policy indicates whether to prioritize the scanned channels of the requested network entry from the "profile history" table, and the early termination condition. Entries can be removed from this table. Remote disconnection can be used to refresh the profile history table and make sure the data is valid. These are cases when one might 'flush' some of the data in the profile history table. This feature can shorten the scan up to a level of single channel probe request and wait for response from the known SSID.

Block 218 comprises checking whether DHCP fast renew exists for this ID number of the SSID (bssid). There can be several identical SSID (names), but each has its own ID. Block 218 follows both block 214 and block 210. If DHCP fast renew exists for this bssid block, a DHCP fast renew 224 procedure is initiated. Step 228 verifies whether L2/L3 reconstruction was successful and sockets exist. In L4, if able to reconstruct L2/L3, one can passively try to keep using the same L4 parameters. If the L2/L3 reconstruction was successful and sockets do exist, the same sockets are used in step 230, otherwise the sockets are flushed in step 232. If the DHCP fast renew does not exist for this bssid, block 222 is reached comprising a full DHCP discover plus request then to block 226 comprising storing this information in a DHCP fast renew database.

FIG. 2B includes the activity responsive to the API "GET HOST BY NAME" 240 referring to the DNS server as the host and this activity is above L2 (L3) and includes block 245 comprising checking whether the host name exists in the memory 263, and if so returning its IP address to block 240, and if not executing block 250 comprising checking whether ARP exists for the DNS server. If no ARP exists for the DNS server in block 250, block 255 is reached comprising sending an ARP request on the DNS server then storing the data obtained from the DNS server in ARP memory 258. Block 260 comprises a DNS request to get the host by name, and the block 263 storing the data obtained in DNS memory.

Figure 3:
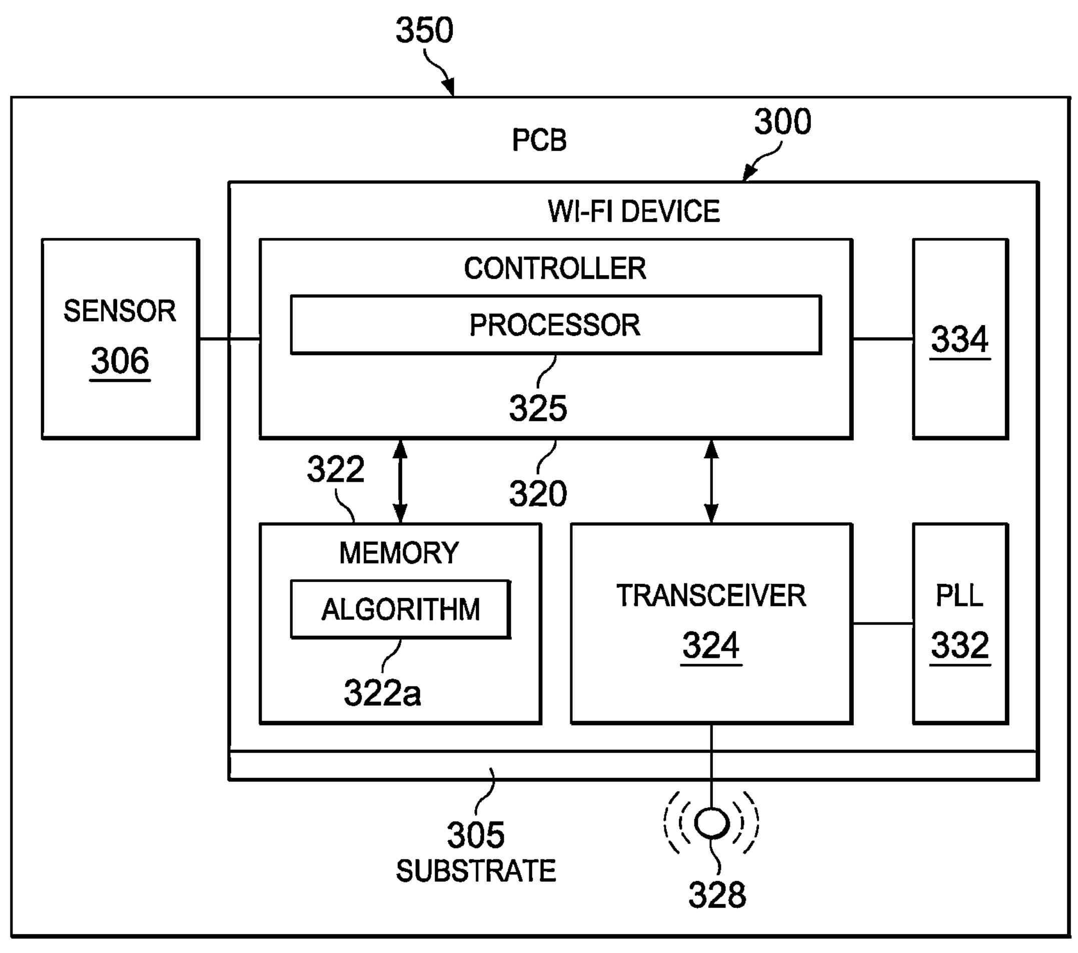
FIG. 3 shows an example Wi-Fi device that can implement disclosed methods of accelerated reconnecting to a Wi-Fi network for implementing power conservation.

FIG. 3 is a system block diagram representation of an example Wi-Fi device 300 that generally conforms to the IEEE 802.11 communications standard. The Wi-Fi device 300 is shown formed as an integrated circuit (IC) on a substrate 305 that has a semiconductor surface (e.g., a silicon substrate), wherein the processor comprises a digital signal processor (DSP) or a microcontroller. One or more sensors 306 are shown optionally coupled to the Wi-Fi device 300 shown being on the same printed circuit board (PCB) 350 for interacting with the physical world. The sensor(s) may also be formed on the substrate 305.

The Wi-Fi device 300 communicates in a Wi-Fi network sometimes referred to as being a WLAN network. The Wi-Fi device comprises a controller 320 including a processor 325, a memory 322 including software stored in the memory for a disclosed accelerated reconnecting to a Wi-Fi network algorithm **322*a*, and a transceiver 324 that is coupled to the processor 325 and to an antenna 328. The memory 322 is more generally configured to store information including data, instructions, or both. The memory 322 may be any storage medium accessible by the controller 320, such as a read only memory (ROM), a random access memory (RAM), a register, cache memory, or magnetic media device such as internal hard disks and removable disks. A phase lock loop (PLL) 332** is also provided for purposes including signal mixing and frequency synthesis.

The Wi-Fi device 300 is also shown including hardware comprising digital logic 334 that can also be provided for implementing a disclosed accelerated reconnecting to a Wi-Fi network algorithm. However, as noted above, the accelerated reconnecting to a Wi-Fi network algorithm **322*a* as shown in FIG. 3 may also be implemented by software stored in a memory such as memory 322 by the processor 325**.

The controller 320 is coupled to the memory 322 and to the transceiver 324. In some implementations, the transceiver 324 comprises baseband units (not shown) and analog units (not shown) to transmit and receive RF signals. The baseband unit may comprise hardware to perform baseband signal processing including digital signal processing, coding and decoding, modulation, and demodulation. The analog unit may comprise hardware to perform analog to digital conversion (ADC), digital to analog conversion (DAC), filtering, gain adjusting, up-conversion, and down-conversion. The analog unit may receive RF signals from an access point and down-convert the received RF signals to baseband signals to be processed by the baseband unit, or receive baseband signals from the baseband unit and up-convert the received baseband signals to RF wireless signals for uplink transmission. The analog unit comprises a mixer to up-convert the baseband signals and down-convert the RF signals with a carrier signal oscillated at a radio frequency of the WLAN system. The radio frequency may be 2.4 GHz or 5 GHz utilized in WLAN systems conforming to 802.11a/b/g/n/ac specifications, or other specifications depending on future radio access technology.

Figures 4A, 4B:
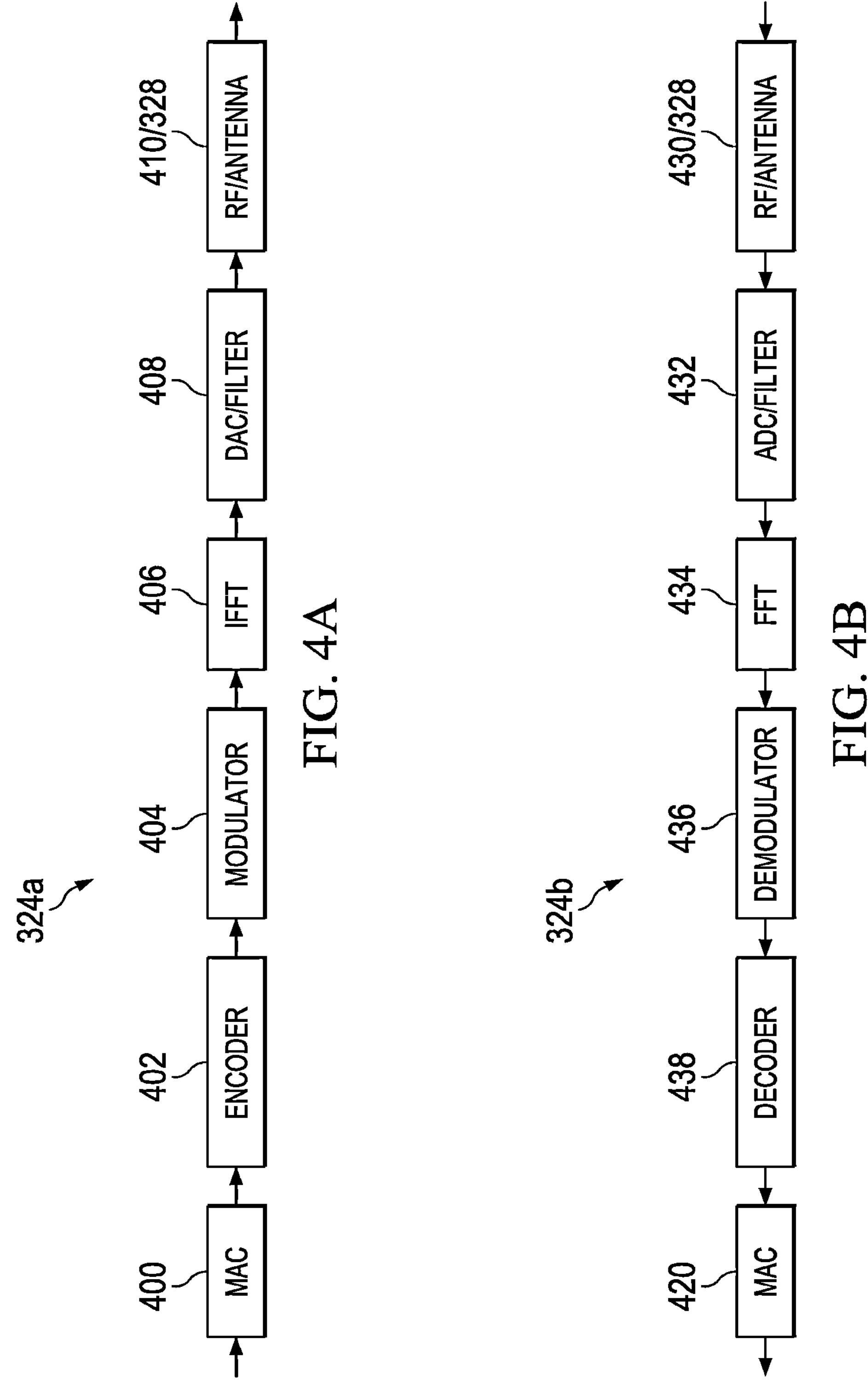
FIG. 4A is a block diagram of an example transmitter for a disclosed Wi-Fi device, according to an example embodiment.
FIG. 4B is a block diagram of an example receiver for a disclosed Wi-Fi device, according to an example embodiment.

FIG. 4A is a block diagram of an example transmitter **324*a* portion of the transceiver 324 shown in FIG. 3. The transmitter 324*a* is shown comprising a MAC module 400, an encoder 402, a modulator 404, an Inverse Fast Fourier Transform (IFFT) unit 406, a DAC/filter module 408, and an RF/antenna module 410/328. The transmitter 324*a*** can produce outgoing RF signals in one or more frequency ranges to be transmitted over one or more communication channels. The frequency range can include a group of OFDM sub-carriers.

The MAC module 400 may include one or more MAC control units (MCUs) to produce and pass MAC Protocol Data Units (MPDU), corresponding preamble and header data streams to the encoder 402, which may perform Forward Error Correction encoding thereto to produce respective encoded data stream. Forward Error Correction (or channel coding) adds redundant data providing error control for data transmission to a message to be transmitted. The FEC codes may be a block code or a convolutional code. The block code comprises a fixed size block of symbols. The convolutional code comprises symbol streams of predetermined or arbitrary length. The modulator 404 performs modulation schemes on the encoded data streams according to the data type to produce modulated data streams to the IFFT module 406. The modulation schemes can comprise, for example, Phase-Shift Keying (PSK), a Frequency Shift Keying (FSK), an Amplitude Shift Keying (ASK), or Quadrature Amplitude Modulation (QAM).

The IFFT module 406 can further include an OFDMA module, where the OFDMA module maps different modulated streams to different subcarrier groups before IFFT processing. In some implementations, the IFFT module 406 may perform an IFFT on outputs of the modulator 404 to generate one or more time domain signals associated with one or more frequency range. In some implementations, the IFFT module 406 can be configured to use one or more FFT bandwidth frequencies such as 20 MHz, 40 MHz, 80 MHz, or 160 MHz. In some implementations, the IFFT module 406 may perform different IFFTs on the modulated data streams according to different FFT bandwidths. Next, the DAC/filter module 408 converts the time domain signal to an analog signal and shapes the analog signal for transmission via the RF/antenna module 410/328. The RF/antenna module 410/328 comprises one or more up converters (not shown) that up-convert the analog signals to corresponding frequency bands for the transmitter antennas to perform transmission.

FIG. 4B is a block diagram of an example receiver 324*b* portion of the transceiver 324 shown in FIG. 3. The receiver 324*b* comprises an RF/antenna unit 430/328, an ADC/filter unit 432, a FFT unit 434, a demodulator 436, a decoder 438, and a MAC module 420. The RF/antenna unit 430/328 is coupled to the ADC/filter unit 432, the FFT unit 434, the demodulator 436, the decoder 438, and then to the MAC module 420.

In operation the receiver 324*b* receives incoming RF signals in one or more frequency ranges over one or more communication channels. The frequency range can include a group of OFDM sub-carriers. The receiver 324*b* performs signal processing to process received data packets in a reverse order to the transmitter 324*a* to recover the information therein. The receiver 324*b* is generally capable of detecting a data type of various WLAN generation signals including IEEE 802.11a/b/g (legacy), IEEE 802.11n, IEEE 802.11ac, or a future WLAN generation based on the signal field in the received data packet.

The RF/antenna 430/328 retrieves the incoming signal comprising the PPDU, and performs down-conversion. The ADC/filter unit 432 filters the down-converted signal and transforms which into digital data sequence. The FFT unit 434 transforms the digital data sequence to a frequency domain data sequence. The demodulator 436 determines the modulation type of the symbols in the frequency domain data sequence, thereby determining the WLAN generation of the received data, and demodulates the payload data field.

Figures 5A, 5B:
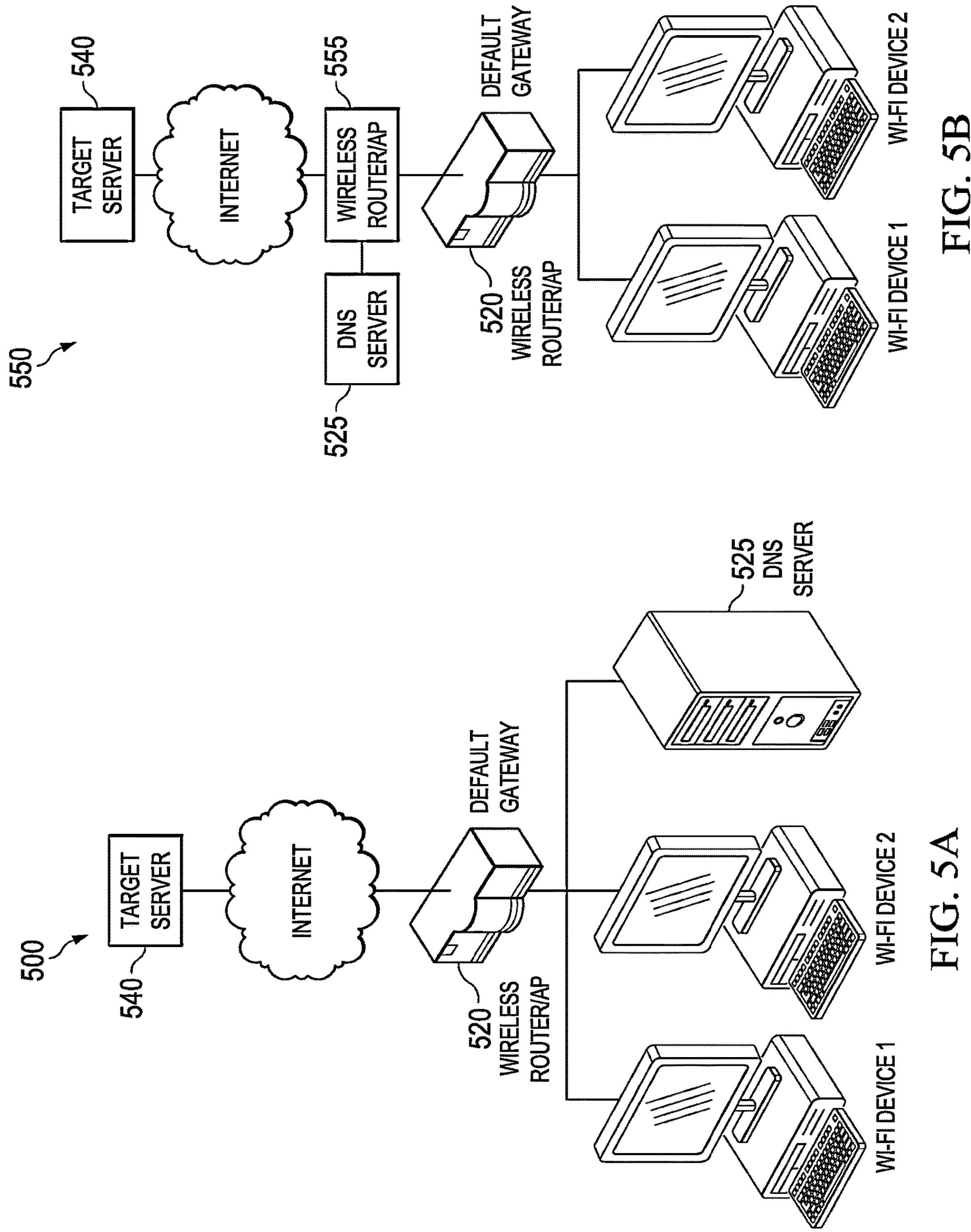
FIG. 5A shows a first and second disclosed Wi-Fi device in an example network arrangement with a wireless router/AP and a target server in Internet communications with the wireless router/AP, where the DNS server shown is under the same router/AP as the Wi-Fi devices.
FIG. 5B shows a first and second disclosed Wi-Fi device in an example network arrangement with a wireless router/AP and a target server in Internet communications with the wireless router/AP where the DNS server is shown under a different router/AP as the Wi-Fi devices.

FIG. 5A shows a disclosed Wi-Fi device 1 and Wi-Fi device 2 in an example Wi-Fi network arrangement 500 with a wireless router/AP 520 and a target server 540 in Internet communications with the wireless router/AP 520. The DNS server 525 shown is under the same wireless router/AP 520 as the Wi-Fi devices 1 and 2. A DHCP server (not shown in FIG. 5A) can be placed in the wireless router/AP 520. FIG. 5B shows a disclosed Wi-Fi device 1 and Wi-Fi device 2 in an example Wi-Fi network arrangement 550 with a wireless router/AP 520 and a target server 540 in Internet communications with the wireless router/AP 520, where the DNS server 525 is now shown under a different router shown as wireless router/AP 555 as the wireless router/AP 520 utilized by the Wi-Fi devices 1 and 2.

Advantages of disclosed Wi-Fi devices having a disclosed accelerated reconnecting to a Wi-Fi network algorithm include a significant improvement in battery lifetime for applications requiring temporary and short access to the network. Such Wi-Fi devices are highly suitable to IoT use cases. There is only a minor degradation in power in the case of a fast reconnection failure, in which conventional/smart scanning may then be used. Disclosed Wi-Fi devices are well suited for home automation, smart energy, multimedia devices, security and safety devices, and industrial machine-to-machine (M2M) applications.

Regarding detectability of disclosed accelerated reconnecting to a Wi-Fi network algorithm, detection can be accomplished by sniffing transactions over the air and analyzing whether a full conventional access procedure to a Wi-Fi network was conducted. Alternatively, detecting accelerated reconnecting to a Wi-Fi network can be based on confirming use of at least in part restored parameters.

Those skilled in the art to which this disclosure relates will appreciate that many other embodiments and variations of embodiments are possible within the scope of the claimed invention, and further additions, deletions, substitutions and modifications may be made to the described embodiments without departing from the scope of this disclosure.

What is claimed is:

1. A method comprising:

disconnecting a wireless device from a wireless network;

after disconnecting the wireless device from the wireless network, waking up the wireless device, wherein, upon wake-up of the wireless device, memories of the wireless device are reset while preserving connection data associated with a previous connection to a first router of the wireless network, wherein the preserved connection data comprises; at least one socket that is open, a basic service set identifier (BSSID), an internet protocol (IP) address, and a media access control (MAC) address, and wherein the connection data is stored in the wireless device based at least in part on the BSSID of the first router;

after waking up the wireless device, attempting, by the wireless device, to establish a connection with the first router of the wireless network using a wireless communication protocol via a first channel of the wireless communication protocol, the wireless communication protocol comprising N channels, N being a positive integer; and responsive to a successful attempt by the wireless device to establish the connection with the first router using the first channel, restoring the previous connection to the first router based at least in part on reconstructing layer 2 (L2) and layer 3 (L3) parameters of the previous connection with the preserved connection data.

2. The method of claim 1, wherein the memories of the wireless device comprise non-volatile memory and random access memory (RAM).

3. The method of claim 1, wherein the preserved connection data comprises an indication of the first channel, the method further comprising selecting the first channel to attempt to establish the connection with the first router based on the preserved connection data.

4. The method of claim 1, wherein the preserved connection data comprises an IP address of the first router.

5. The method of claim 1, wherein the preserved connection data comprises an IP address of a target server.

6. The method of claim 1, wherein the preserved connection data comprises an IP address of the wireless device, and wherein restoring the previous connection comprises restoring the IP address of the wireless device.

7. The method of claim 1, further comprising:

obtaining MAC level data from the first router before disconnecting the wireless device from the wireless network; and storing the MAC level data in the memories of the wireless device as part of the connection data.

8. The method of claim 1, wherein the first channel is in the 2.4 GHz band.

9. The method of claim 1, wherein the first channel is in the 5 GHz band.

10. The method of claim 1, wherein the wireless network is a WiFi network.

11. The method of claim 1, further comprising maintaining a networks database in the memories of the wireless device with respective sets of connection parameters associated with L different routers, L being a positive integer.

12. The method of claim 11, wherein the networks database further comprises respective channels associated with respective wireless network connections ordered according to a priority of a respective network.

13. The method of claim 1, further comprising storing the connection data in the memories of the wireless device.

14. A wireless device comprising:

memories;

a transceiver; and a processor configured to:

disconnect the wireless device from a wireless network;

after disconnecting the wireless device from the wireless network, wake up the wireless device, wherein, upon wake-up of the wireless device, the memories are reset while preserving connection data associated with a previous connection to a first router of the wireless network, wherein the preserved connection data comprises; at least one socket that is open, a basic service set identifier (BSSID), an internet protocol (IP) address, and a media access control (MAC) address, and wherein the connection data is stored in the wireless device based at least in part on the BSSID of the first router;

after waking up the wireless device, attempt to establish a connection with the first router of the wireless network using a wireless communication protocol via a first channel of the wireless communication protocol, the wireless communication protocol comprising N channels, N being a positive integer;

and responsive to a successful attempt to establish the connection with the first router using the first channel, restore the previous connection to the first router based at least in part on reconstruction of layer 2 (L2) and layer 3 (L3) parameters of the previous connection with the preserved connection data.

15. The wireless device of claim 14, wherein the memories of the wireless device comprise non-volatile memory and random access memory (RAM).

16. The wireless device of claim 14, wherein the preserved connection data comprises an indication of the first channel, and wherein the processor is configured to select the first channel to attempt to establish the connection with the first router based on the preserved connection data.

17. The wireless device of claim 14, wherein the preserved connection data comprises an IP address of the first router.

18. The wireless device of claim 14, wherein the preserved connection data comprises an IP address of a target server.

19. The wireless device of claim 14, wherein the preserved connection data comprises an IP address of the wireless device, and wherein restoring the connection parameter comprises restoring the IP address of the wireless device.

20. The wireless device of claim 14, wherein the processor is configured to:

obtain MAC level data from the first router before disconnecting the wireless device from the wireless network; and store the MAC level data in the memories as part of the connection data.

* * * * *